Jan. 29, 1952   J. L. BLAYNEY   2,583,763
ELECTROSTATIC APPARATUS FOR MEASURING VOLTAGES
Filed April 26, 1949

INVENTOR.
JAMES LEONARD BLAYNEY
BY
Brown, Denk & Lynnestvedt
AGENTS

Patented Jan. 29, 1952

2,583,763

UNITED STATES PATENT OFFICE 2,583,763

ELECTROSTATIC APPARATUS FOR
MEASURING VOLTAGES

James Leonard Blayney, Lansdale, Pa., assignor to Philco Corporation, Philadelphia, Pa., a corporation of Pennsylvania Application April 26, 1949, Serial No. 89,693

12 Claims. (Cl. 171—95)

This invention relates to potential-measuring devices of the electrostatic type and, particularly, to devices used in the measurement of high potentials. More specifically, the invention is concerned with a novel method of and apparatus for utilizing the motion of a conductive member or plate to indicate the magnitude of applied potentials.

Potential-measuring devices capable of measuring high potentials are known in the art. There are several known types of devices which utilize the electrostatic force produced by the application of potential between two conducting bodies, to indicate the magnitude of said applied potential. Generally, such electrostatic devices come within either of two categories, namely, those which are used for general measuring purposes, and those which serve as laboratory standards used to calibrate the general purpose instruments.

With the general purpose type of instrument the magnitude of the force produced by the applied potentials is commonly indicated by pointer means actuated through delicate and complex mechanical linkages. Such pointer means, in co-operation with calibrated scales, provide an indication of the magnitude of the applied potential. Frequently springs are employed to balance the force produced by the applied potentials, and damping is required, this damping being accomplished through the agency of either electrical or mechanical means.

Such general purpose instruments, or meters, have not proven highly satisfactory, particularly in that they are inherently of complex and expensive nature, and because the apparatus is frequently delicate and subject to damage. Such meters are often unduly large and cumbersome. Devices of this type are calibrated initially, and also at subsequent intervals, against a standard meter, and the calibrations from which the voltages are read are usually non-linear. Commonly the calibrations are compressed at one end of the range, thus making the instrument more difficult to read, and causing the percent error of the instrument to be variable over the range. This non-linearity also makes corrections in calibration a relatively difficult matter. Further, it has been recognized that non-linear calibrations are disadvantageous, since they are inherently difficult and expensive to make.

Instruments coming within the second of the two general categories mentioned above have also left much to be desired, in which connection it should be understood that the absolute type of meter, frequently used as a laboratory standard, usually consists of: two or more conducting plates of predetermined size; and a delicate balance system which is associated with one of the plates, or sets of plates, and is adapted to indicate the force between said plates for a given applied potential and plate separation.

This second type of device not only requires great precision in manufacture, thus being inherently of a very expensive nature, but is also very large and much too delicate to be transported readily. Further, such devices frequently cannot be read directly.

Because of the above considerations, laboratory standard meters capable of measuring high potentials are not commonly available.

The present invention is concerned with overcoming the aforementioned difficulties and disadvantages encountered with instruments known to this art, the invention having, for one of its more important objects, the provision of a novel method of and apparatus for indicating the magnitude of voltages to be measured, in terms of the distance between a pair of conductive plates of predetermined dimensions and of the electrostatic force existing between said plates.

It is another object of this invention to provide an absolute high-voltage meter which is simple to manufacture, easy to use, and is unique in that it employs no springs, magnets, or other delicate balancing means. It will be appreciated that usage of springs, and the like, results in apparatus which is deleteriously affected by temperature or humidity changes and the accuracy of which depends upon very delicate handling.

A further object resides in the provision of a potential-measuring device that is accurate, dependable, rugged and small, thus enabling its use for a variety of purposes and making it possible to transport the instrument to any necessary location.

The foregoing, together with other objects and constructional features of this invention, may be clearly understood from the following detailed description in which two embodiments of the invention are described, said description being taken in the light of the accompanying drawing, in which.

Figure 1:
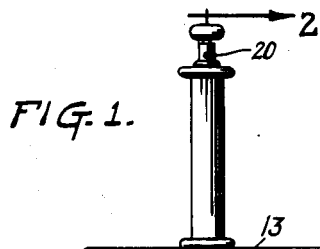
Figure 1 is an elevational view of a potential-measuring device constructed in accordance with the principles of the present invention.

Prior to a detailed consideration of the apparatus shown in the drawing, it is helpful to make brief reference to certain theoretical considerations which underlie the concepts of this invention. My invention makes use of the well recognized fact that when a difference of potential is applied between a pair of conducting plates, or electrodes of predetermined dimensions and separation, an electrostatic force, or attraction, will be present between the two conducting plates, the magnitude of said force being a function of the dimensions of the plates, the plate separation, and the magnitude of the applied potential. The electrostatic attraction F present between two parallel plates of area A and separation $d$, and between which plates a potential V is applied, is given by:

$$F = \frac{KV^2 A}{d^2 8\pi}$$

where K is the dielectric constant of the material between the plates. In apparatus of the type here concerned, the dielectric material is air and its dielectric constant is assumed to be equal to unity.

Thus it is possible to determine the potential by measuring the purely physical quantities $d$, A and F. As will be set forth with more particularity hereinafter, instruments contemplated by this invention include a light body or disc supported for free movements under the influence of electrostatic force resulting from the application of the potential to be measured. The force (F), in such apparatus, is measured by the lifting of said body or disc, while A represents the area of the disc and $d$ the distance between said disc and the other plate.

By converting the above force equation, simple physical quantities requiring measurement are obtained, as shown by the following equation.

$$V = 47100\, d\sqrt{Dt}$$

where

D is the density of the disc material in grams/cm.$^3$,
$d$ is the plate separation distance in cm., and
$t$ is the thickness of the disc in cm.,
V being in volts.

Figure 2:
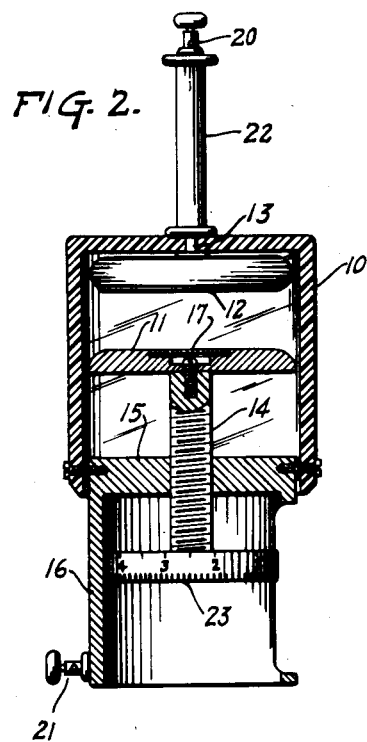
Figure 2 is a vertical sectional view taken as indicated by the line 2—2, of Figure 1.

Now making more detailed reference to the drawing, and particularly to Figures 1 and 2 thereof, it will be seen that the potential-measuring instrument therein illustrated comprises an inverted cup or housing 10 fabricated of some suitable transparent, non-conductive material. Various materials may be employed for this purpose, and the configuration of the housing may be varied to fit the requirements of the apparatus under consideration, but it is to be borne in mind that the material must be such as to be capable of withstanding high potentials, without break-down.

Within the housing are disposed a pair of parallel, spaced conducting plates or electrodes 11 and 12, plate 12 being mounted in the upper portion of the housing in any convenient manner as, for example, through the agency of the metallic screw element shown at 13, and plate 11 being mounted for reciprocal movements within the housing 10 (and with respect to the fixed plate 12) through the agency of a micrometrically adjustable screw member 14 in threaded engagement with the upper wall 15 of a cylindrical metallic base or support 16.

Figure 3:
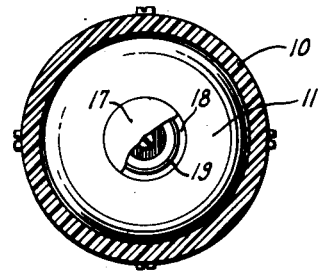
Figure 3 is a horizontal sectional view taken as indicated by the section line 3—3 applied to Figure 1.

In particular accordance with the present invention, plate 11 has freely supported on the upper surface thereof a small light metallic disc 17 which is preferably, although not necessarily, of flat circular configuration. To accommodate the disc 17, and to prevent inadvertent horizontal displacement thereof, the plate 11 is recessed, as shown at 18 (Figure 3), this recess serving to maintain the disc 17 in a central position with respect to plate 11, and also operating to eliminate undesirable edge effects which might otherwise occur, were the disc to present a sharp edge above the surface of the plate 11. The foregoing purposes are best served if the horizontal clearance between the disc and the recess is minimal, and it is to be understood that the formula last mentioned has direct application when the disc is thus countersunk within the surface of plate 11. It is also contemplated, as shown in the drawings, that the edges of the plates 11 and 12 should be of rounded configuration, this also being resorted to in order to minimize the effects of corona. In the broader aspect of this invention, other means may be employed to maintain the disc 17 in proper position with respect to the plate 11, but the illustrated arrangement has proven very satisfactory, particularly where a high degree of accuracy is essential. Similarly, the micrometer screw member 14 may, if desired, be replaced by other mechanisms or systems capable of accurately and measurably varying the separation between the plates 11 and 12.

It will be noted that the recess 18 formed in plate 11 is provided with an upstanding annular flange 19 upon which the disc 17 rests. In this way the disc is freely supported upon the plate, and molecular attraction between the metal of which both the disc and plate are constituted, cannot operate to impede free vertical movement of the disc with respect to the plate. The conditions under which such movement occurs are explained hereinafter.

In order that the potentials to be measured may be applied across the plates 11 and 12, the instrument is provided with a high voltage terminal 20 and a ground terminal 21, said high voltage terminal being in electrically conductive association with plate 12, through the agency of a current-limiting resistor 22. For certain classes of use, for example when the apparatus is used to measure potentials from sources such that the potential decreases sharply when a moderate amount of current is drawn, the resistor 22 may be omitted.

In order to vary the spacing between the plates 11 and 12, and to determine the potential applied therebetween, the screw member 14 carries, at its lower extremity, a rotatable drum member 23, suitably graduated in terms of plate separation, and adapted to cooperate with fixed graduations extending vertically along surface 24 of the metallic base or support 16.

The nature of the invention, in both the method and the apparatus aspects thereof, may now be clearly understood by considering the adjustment and action of the instrument in operation. Prior to use, the plates 11 and 12 are set to a wide separation, by effecting counterclockwise rotation of the drum 23, and the disc 17 is properly seated within the aforesaid recess 18. The high potential source, the voltage of which is to be measured, is then connected across terminals 20 and 21, and the drum 23 is rotated clockwise, slowly, thus gradually decreasing the plate separation. This decrease in separation is continued until the disc 17, due to the electrostatic force acting upon it, rises from its normal position of rest upon plate 11. After the disc has started to rise, it may rise rapidly toward a vertical position and bridge the gap between the plates 11 and 12, thus causing a short circuit. Should a short circuit occur, however, the resistor 22 operates to limit the short circuit current and thus to prevent damage to the meter and to the source of voltage.

Under certain conditions, and with embodiments in which that plate which carries the conductive body rotates during adjustments in plate separation, it has been found that a further indication is available to apprize the operator that the conducting body has just begun to move away from the plate upon which it rests. This indication results from the fact that when the conductive body or disc has risen from the plate a scarcely perceptible distance, said disc no longer rotates with the plate which supports it.

Thus, in embodiments of such type, cessation of rotation of the disc with the plate may provide an indication that a voltage reading should be taken. It is to be understood, however, that this latter indication also involves some movement of the disc with respect to the supporting plate, and that such indication is contemplated by the appended claims.

The magnitude of the applied potential, when the disc 17 has risen, may be readily determined by observing the graduations of the drum 23 and the position of said graduations with respect to the vertically extending calibrations provided upon the surface 24. It is to be understood that no voltage calibration is necessary. The weight of the disc is so chosen that the plate separation, in millimeters, required to produce a force equal to that weight, becomes numerically equal to the potential under measurement, expressed in kilovolts. As will be appreciated, calibrations of any convenient type may be employed, the illustrated graduations being intended for exemplary purposes only. As is shown by the last equation reproduced above, the voltage is linearly-proportional to the plate separation, and it will therefore be appreciated that the foregoing process results in a direct indication of the applied voltage.

When it is desired to repeat the measurement procedure, the source is disconnected from the terminal 20. The latter terminal is then connected momentarily with the terminal 21, thereby discharging the instrument. Following such discharge, the above described procedure may be repeated.

Figure 4:
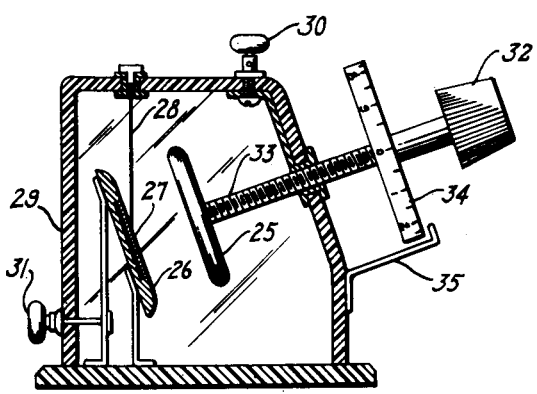
Figure 4 is a vertical sectional illustration of apparatus comprising another embodiment of my invention.

For certain applications, where unusually high sensitivtiy is a factor, the apparatus may take the form of the embodiment illustrated in Figure 4. The apparatus of this second embodiment is similar, in all essential aspects, to that already described, differing primarily in that, in the second embodiment the conducting plates are disposed at an acute angle with respect to the horizontal. A light thread, or other flexible support means is utilized to support the vertical component of the weight of the disc which rests upon the angularly disposed lower plate of the instrument. In this embodiment, the working parts are the upper plate 25 and lower plate 26, the disc 27 and the supporting thread 28. Preferably the apparatus is enclosed within a housing 29, which is electrically non-conductive and of transparent material.

The high potential terminal 30, and the lower or ground terminal 31 are available for connection to the potential to be measured. As will be understood, the insulated control knob 32 serves to rotate the metal rod 33 which supports plate 25, and thus varies the separation between the plates. In order to indicate the magnitude of the applied potentials, the rod 33 carries a drum 34 provided with graduations cooperable with graduations provided upon a fixed reference pointer 35.

With proper selection of the angular disposition of the plates, the component of the weight of the disc 27, perpendicular to the face of plate 26, may be made to assume a small value as compared with the vertical component. This results in apparatus in which the electrostatic force required to move the disc 27 may be very minute and, since this force has to overcome only the smaller component, this type of instrument is extremely sensitive.

In operation, the insulated knob 32 is rotated in a direction to lessen the gap between plates 25 and 26, the source of potential to be measured having first been connected across the terminals 30 and 31. As was the case with reference to the embodiment already described, a voltage reading may be taken after the disc 27 has moved away from plate 26. It is preferable that the thread 28 be of some electrically non-conductive material the length and the insulating quantities of which are substantially unaffected by changes in humidity. A quartz thread is suitable for this purpose.

A current limiting resistor, similar to the above described resistor 22, may be placed in series with the plate 25 if the apparatus is to be used under conditions such that there would otherwise be a substantial drop in potential when a small amount of current is drawn.

From the foregoing description it will be understood that the invention makes it possible to test high voltages in such manner that the indications of the instrument may be directly read, and the scale graduations are linear throughout the range of the instrument. Furthermore, instruments built in accordance with this invention are advantageous in that the necessity for damping, as used in the prior art, is completely eliminated. Also, the apparatus is simple and inexpensive to make, not involving critical manufacturing tolerances. It is is particularly noteworthy that the simplicity of the instrument renders it unaffected by changes in temperature or humidity and that, since it includes no delicate and complex linkages, its use does not necessitate unusually careful or skillful handling.

While several embodiments of my invention have been described with particularity, it should be understood that the invention is susceptible of changes and modifications without departing from the essential concept thereof. However, it will be recognized that such changes and modifications are contemplated as may come within the scope of the appended claims.

I claim:

1. In an electrostatic potential-measuring device: a pair of electrically conductive plates arranged in substantially parallel, spaced juxtaposition; means for applying between said plates a potential to be measured; a conductive member subject to force normally serving to maintain it closely associated with one of said plates and having freedom for unconstrained movement in a direction away from said one plate and toward the other of said plates; and means for varying the spacing between said conductive plates with resultant variation of the spacing between said member and the said other plate, said conductive member being responsive to the electrostatic force existing between said plates, as a result of the application of the mentioned potential, to move away from the said one plate and toward the said other plate, and thus indicate when the spacing is such that the electrostatic force just exceeds the force serving to maintain said member in association with the said one plate.

2. In an electrostatic potential-measuring device: a pair of electrically conductive plates arranged in substantially parallel, spaced juxtaposition; means for applying between said plates a potential to be measured; a conductive member subject to force normally serving to maintain it closely associated with one of said plates and having freedom for unconstrained movement in a direction away from said one plate and toward the other of said plates; means for varying the spacing between said conductive plates with resultant variation of the spacing between said member and the said other plate, said conductive member being responsive to the electrostatic force existing between said plates, as a result of the application of the mentioned potential, to move toward the said other plate; and means effective to indicate the magnitude of the applied potential—when said member has so moved—in terms of the spacing between said plates.

3. In an electrostatic potential-measuring device: a pair of electrically conductive plates arranged in substantially parallel, spaced juxtaposition; means for applying between said plates a potential to be measured; a conductive member of predetermined shape, area and mass, said member being subject to force normally serving to maintain it closely associated with one of said plates and having freedom for unconstrained movement in a direction away from said one plate and toward the other of said plates; means for varying the spacing between said conductive plates with resultant variation of the spacing between said member and the said other plate, said conductive member being responsive to the electrostatic force existing between said plates, as a result of the application of the mentioned potential, to move toward the said other plate; and means effective to indicate the magnitude of the applied potential—when said member has so moved—in terms of the spacing between said plates.

4. In an electrostatic potential-measuring device: a pair of conductive bodies arranged in vertically spaced juxtaposition; means for applying between said bodies a potential to be measured; a conductive member supported upon the lower of said bodies with freedom for movement away from said lower body and toward the upper thereof; and means for varying the spacing between said conductive bodies with resultant variation of spacing between said member and the said upper body, said conductive member being responsive to the electrostatic force existing between said bodies, as a result of the application of the mentioned potential, to move toward said upper body and thus indicate when the spacing is such that the electrostatic force just exceeds the gravitational force acting upon said conductive member.

5. In an electrostatic potential-measuring device: a pair of conductive plates arranged in parallel, vertically spaced juxtaposition; means for applying between said plates a potential to be measured; a plane conductive member of predetermined area and mass supported upon the lower of said plates with freedom for movement away from said lower plate and toward said upper plate; means for varying the spacing between said conductive plates with resultant variation of the spacing between said member and said upper plate; said member being responsive to the electrostatic force existing between said plates, as a result of the application of the mentioned potential, to move away from the lower plate and toward the upper plate; and means effective to indicate the magnitude of the applied potential—when said member has so moved—in the spacing between said plates.

6. A device in accordance with claim 5, and further characterized in that the lower of said plates is provided with a recess of horizontal dimensions just sufficient to receive said conductive member, and in which device said member is seated within said recess when supported upon said lower plate.

7. A device in accordance with claim 6 and further including flange means upstanding from the lower surface of said recess and providing the mentioned support for said member.

8. In an electrostatic potential-measuring device: a transparent, electrically non-conductive housing; a pair of conductive plates disposed within said housing and arranged in vertically spaced juxtaposition; means for applying between said plates a difference of potential to be measured; a flat conductive member of predetermined area and mass supported on the lower of said plates with freedom for movement away from said lower plate and toward said upper plate; control means extending within said housing and operatively associated with one of said plates to vary the spacing between said plates with resultant variation between said member and said upper plate, said member being responsive to the electrostatic force existing between said plates, as a result of the application of the mentioned potential, to move away from said lower plate and toward said upper plate; and scale mens responsive to the distance between said plates to indicate the magnitude of the applied potential.

9. A device in accordance with claim 8, and further characterized in that said scale means comprises a manually rotatable member adapted to impart movement to said control means whereby to accomplish the mentioned variation in spacing between said plates.

10. A device in accordance with claim 3, and further including a resistor effective to limit the current which may flow between said plates in the event that said conductive member should bridge the space between said plates.

11. In an electrostatic potential-measuring device: a pair of spaced conductive plates disposed in parallelism and at an acute angle with respect to the horizontal; means for applying between said plates a potential to be measured; a conductive member of predetermined shape, area and mass; flexible means serving to support said member in a position such that it lies against the face of one of said plates, said last means providing support for the vertical component of the weight of said member as it lies against the face of the angularly disposed plate; and means for varying the spacing between said plates with resultant variation of the spacing between said member and the plate spaced therefrom, said conductive member being responsive to the electrostatic force existing between said plates, as a result of the application of the mentioned potential, to move away from the plate against which it lies and toward the other of said plates and thus indicate when the spacing between the plates is such that the electrostatic force just exceeds the component of gravitational force serving to maintain said member against the face of the mentioned plate.

12. In an electrostatic potential-measuring device: a pair of electrically conductive plates arranged in substantially parallel, vertically spaced juxtaposition; means for applying between said plates a potential to be measured; a conductive member of predetermined area and mass supported upon the lower of said plates with freedom for movement away from said lower plate and toward said upper plate; means for varying the spacing between said conductive plates with resultant variation of the spacing between said member and said upper plate, there being one spacing of said plates, for each given potential difference, for which spacing the gravitational force acting upon said member is balanced by the electrostatic force existing between said plates as a result of the application of the mentioned potential; and means effective to indicate the magnitude of the applied potential when said balance is attained.

JAMES LEONARD BLAYNEY.

REFERENCES CITED

The following references are of record in the file of this patent:

UNITED STATES PATENTS

| Number | Name | Date |
| --- | --- | --- |
| 959,551 | Kintner | May 31, 1910 |
| 1,229,699 | Armor | June 12, 1917 |
| 1,502,330 | Bernini | July 22, 1924 |
| 1,605,911 | Bannetz | Nov. 9, 1926 |
| 1,726,866 | Starke | Sept. 3, 1929 |